W. BOSS.
GRASS CATCHER ATTACHMENT FOR LAWN MOWERS.
APPLICATION FILED OCT. 2, 1913.
1,176,881.
Patented Mar. 28, 1916.
2 SHEETS—SHEET 2.
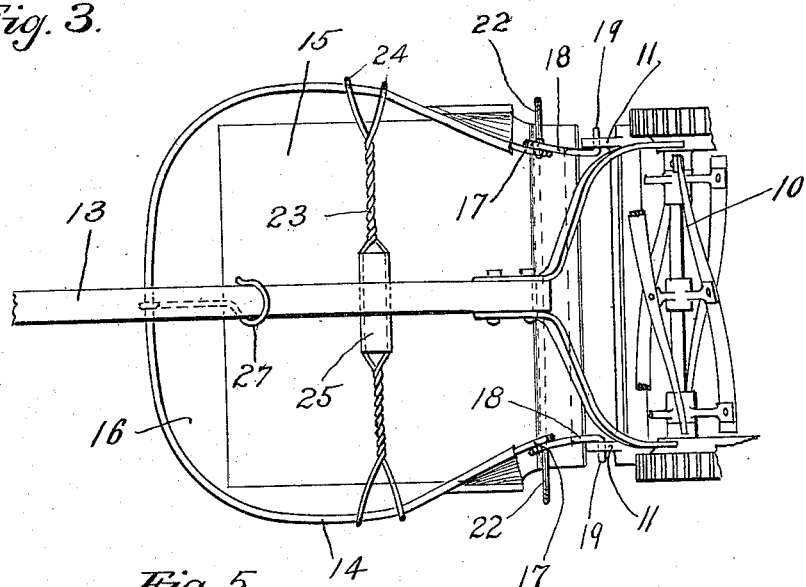
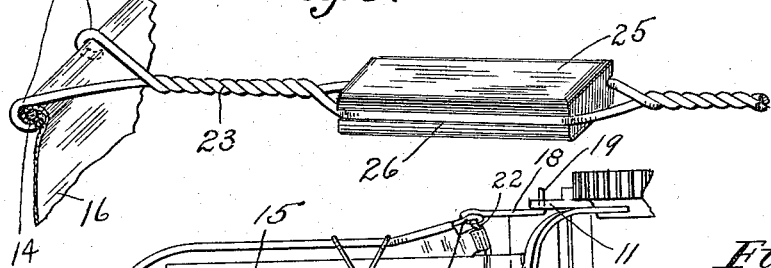
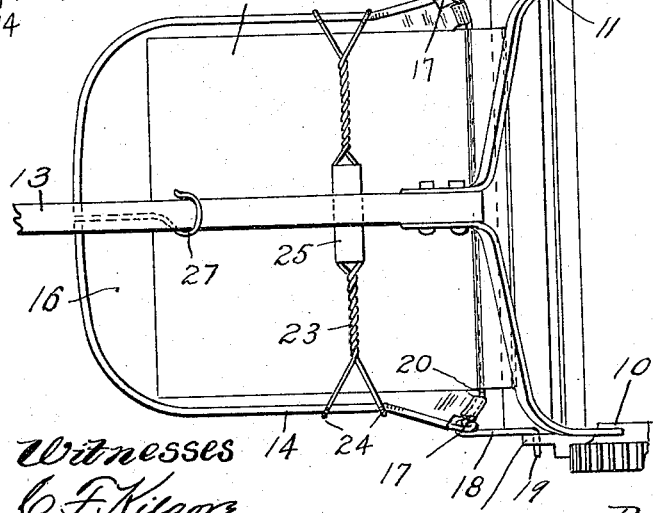
Witnesses
C. F. Kilgore
H. A. Bowman
Inventor
William Boss
By F. A. Whiteley
His Attorney

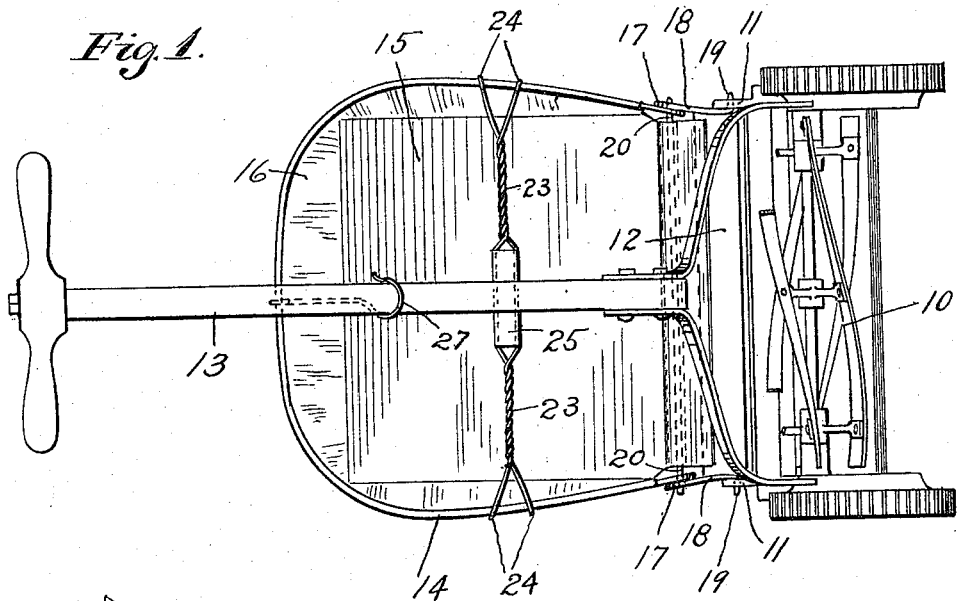
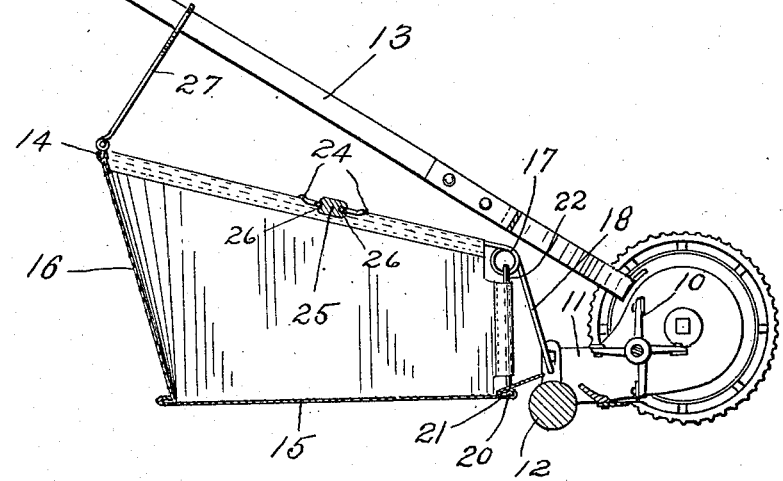

UNITED STATES PATENT OFFICE.

WILLIAM BOSS, OF ST. PAUL, MINNESOTA.

GRASS-CATCHER ATTACHMENT FOR LAWN-MOWERS.

1,176,881. Specification of Letters Patent. Patented Mar. 28, 1916.

Application filed October 2, 1913. Serial No. 792,959.

*To all whom it may concern:*

Be it known that I, WILLIAM BOSS, a citizen of the United States, residing at St. Paul, in the county of Ramsey and State of Minnesota, have invented certain new and useful Improvements in Grass-Catcher Attachments for Lawn-Mowers, of which the following is a specification.

My invention relates to grass catcher attachments for lawn mowers, and has for its object to provide a structure of this class which shall be simple in construction, easy of application, readily adjustable to various sizes and makes of lawn mowers, and removable therefrom if desired.

The full objects and advantages of my invention will appear in connection with the detailed description thereof and are particularly pointed out in the claims.

In the drawings, illustrating the application of my invention in one form, Figure 1 is a plan view of a lawn mower showing a grass catcher embodying my improvements attached thereto. Fig. 2 is a side elevation in section of the parts shown in Fig. 1. Figs. 3 and 4 are plan views showing the grass catcher applied to lawn mowers of different widths. Fig. 5 is a perspective view of the reinforcing hand grip applied to the transverse top wire frame.

As illustrated, the lawn mower 10 comprises the usual roller brackets 11, roller 12, and handle bar 13. My grass catcher embodies a top wire frame 14, a bottom 15 of sheet metal or other material, as desired, and side walls 16 of canvas or other flexible material, the top frame being collapsible upon the bottom. The forward portions of the wires of the top frame 14 are looped, as indicated at 17, and are provided with depending portions 18 each formed with a right angled hook 19 which are adapted to engage within apertures in roller brackets 11. The front wire 20 extends across the front bottom 15, preferably beneath the reversely turned portion 21 thereof, as best indicated in Fig. 2. The ends of the front wire 20 are formed as upright portions 22 which loop into the eyes 17 formed on the ends of top wire 14. The wire 14 and the wire 20 are made of spring material so that the hooks 19 may be sprung inside of the roller brackets 11 and when inserted through the holes thereof, as indicated in Figs. 1 and 3, will be held therein by the combined outward springing action of the upright wires 22, the wires 18 and the forward portions of the top wires 14. To render more effective this action of the top wires 14, and also to aid in the adjusting of the device, as will be later pointed out, I provide a transverse wire brace 23 preferably formed of a pair of wires twisted together and having the separated ends 24 thereof clamping the top wire 14 at points quite close to the loops 17 but far enough therefrom to leave a small extent of the wires 14 between each of said loops and the nearest wire end 24. These forward portions of the wires 14 operate to aid the spring action of the depending wire portions 18 and the upright wire portions 22 in holding the hooks 19 in the holes of the roller bracket. The adjustments for different widths of lawn mowers are effected by bending the upright wires 22 at their junction with the front transverse wire 20 and the ends of wire 14 at the point where they are clasped by forward ends 24 of the brace wire 23.

As indicated in Figs. 1, 3 and 4, it is possible readily to adapt this grass catcher to many different widths of lawn mowers, the grass catcher as ordinarily built being readily applied to lawn mowers of from twelve to twenty inches in width. This feature of adjustability is an essential one in the construction of a practical grass catcher as many sizes of lawn mowers are manufactured, and the different makes have different distances between the inside of the roller brackets for a given size of lawn mower. In the past, devices have been constructed providing these adjustable features, but such devices have involved the use of special springs not a part of the frame structure proper.

It will be seen that my grass catcher does not involve the use of any springs excepting such as are provided by the spring metal of the necessary elements of the frame.

The cross member 23, in addition to its function as a brace and to hold the forward portions of top wire 14 in proper position for their adjusting and springing functions in connecting the grass catcher to the lawn mower, may be provided with a hand grip 25 by which the catcher may be conveniently manipulated in applying same to and removing from the lawn mower. Preferably, I form this hand grip of a rectangular piece of wood having grooves 26 along the edges thereof, the two wires of the transverse member 23 being laid in said groove between the twisted portions of said wires, as clearly shown. This gives an extremely effective hand grip that will not twist in the hand and holds the top frame 14 rigidly in its plane when the same is being manipulated. This structure also very materially increases the rigidity of the cross brace 23 so that comparatively light wire may be employed and yet a very stiff and rigid cross bar result. A hook 26 is employed for removably connecting the grass catcher with the lawn mower handle.

I claim:

1. In combination with the frame of a lawn mower, said frame being provided with transverse openings, a grass catcher comprising a top wire frame adapted to be spread at the front to be applicable to different sizes of lawn mowers, said frame supporting fabric catcher sides serving to vary the size of the mouth of the catcher to fit the discharge stream of different sizes of lawn mowers, said frame having integrally-connected downwardly-turning front ends provided with outwardly-turned hooks engageable with said transverse openings and a front wire having upwardly-turned portions engaging the top wire frame, said wires being of spring metal and forcing said hooks outward, thus holding the catcher in place on the various sizes of lawn mowers.

2. In combination with the frame of a lawn mower, a grass catcher open at the front and top to form a mouth comprising a top wire frame, a front wire frame connected therewith, means movable transversely with said frame portions for detachably engaging the frame of the lawn mower, and a transverse brace connected with the top wire frame at a point near the forward portion thereof, bending of said front wire frame and top wire frame at the point of connection with the brace thereof serving to adjust the attaching means and catcher mouth for different widths of lawn mowers.

3. In combination with the frame of a lawn mower, a grass catcher open at the front and top to form a mouth comprising a top wire frame, a front wire frame connected therewith, means movable transversely with said frame portions for detachably engaging the frame of the lawn mower, and a brace connected with the top wire frame at a point near the forward portion thereof, bending of said front wire frame and top wire frame at the point of connection with the brace thereof serving to adjust the attaching means and catcher mouth for different widths of lawn mowers, said brace being formed of a pair of wires twisted together in a plane transverse to the side wires of the top frame and having separated ends each clamping the wire of the top frame on each side thereof.

4. In combination with the frame of a lawn mower, a grass catcher open at the front and top to form a mouth comprising a top wire frame, a front wire frame connected therewith, means movable transversely with said frame portions for detachably engaging the frame of the lawn mower, and a brace connected with the top wire frame at a point near the forward portion thereof, bending of said front wire frame and top wire frame at the point of connection with the brace thereof serving to adjust the attaching means and catcher mouth for different widths of lawn mowers, said brace member comprising a pair of wires extending in a plane transverse to the side wires of the top frame and a grooved wooden strip between said wires, the wires being twisted together outside of said strip and having separated ends clamped to the top frame at each side thereof.

In testimony whereof I affix my signature in presence of two witnesses.

WILLIAM BOSS.

Witnesses:
F. A. WHITELEY,
H. A. BOWMAN.